United States Patent [19]
Wotzak et al.

[11] Patent Number: 5,638,383
[45] Date of Patent: Jun. 10, 1997

[54] ADVANCED INTEGRATED AVIONICS TESTING SYSTEM

[75] Inventors: William J. Wotzak; Kenneth P. Fecteau, both of San Diego, Calif.

[73] Assignee: TRW Inc., Redondo Beach, Calif.

[21] Appl. No.: 920,340

[22] Filed: Jul. 24, 1992

[51] Int. Cl.$^6$ .................................................. G06F 19/00
[52] U.S. Cl. ...................... 371/22.5; 364/579; 364/481
[58] Field of Search .............................. 364/550, 551.01,
364/580, 152, 158, 159, 160, 186, 179,
579; 371/22.5

[56] References Cited

U.S. PATENT DOCUMENTS

| | | | |
|---|---|---|---|
| 4,397,021 | 8/1983 | Lloyd et al. | 364/580 |
| 4,402,055 | 8/1983 | Lloyd et al. | 364/580 |
| 4,656,632 | 4/1987 | Jackson | 364/580 |
| 4,701,870 | 10/1987 | Mogi et al. | 364/580 |
| 4,701,920 | 10/1987 | Resnick et al. | 371/22.5 |
| 4,724,380 | 2/1988 | Burrows et al. | 371/22.5 |
| 4,926,363 | 5/1990 | Nix | 364/580 |
| 5,036,479 | 7/1991 | Prednis et al. | 364/580 |
| 5,103,167 | 4/1992 | Okano et al. | 371/22.5 |
| 5,184,312 | 2/1993 | Ellis | 364/580 |

*Primary Examiner*—Emanuel T. Voeltz
*Assistant Examiner*—Kyle J. Choi
*Attorney, Agent, or Firm*—Michael S. Yatsko

[57] ABSTRACT

Apparatus, and a related method, for testing complex integrated systems, such as avionics systems. A unified approach to the testing architecture provides for a selection of on-line and off-line tests to be run on a complex system, at selected hierarchical levels. Built-in test logic is provided on each component or chip to be tested, and additional built-in test logic is provided at a module level, where a module includes multiple chips or components of various types. Module testing is, in turn, controlled in part by a maintenance processor responsible for multiple modules, and the maintenance processor is controlled in part by a maintenance executive. The testing architecture can be configured to provide a desired mix of performance testing, processor testing and physical testing of components.

11 Claims, 4 Drawing Sheets

ADVANCED INTEGRATED AVIONICS TESTING SYSTEM

BACKGROUND OF THE INVENTION

This invention relates generally to complex interconnected electronics systems, such as advanced avionics systems in military aircraft, and, more particularly, to problems inherent in maintaining and testing such systems in their normal operational environment. Modern avionics systems make use of high-density electronic packaging and design techniques that greatly increase the functionality of the systems, but have an adverse impact on maintainability and producibility. The adverse impact arises largely because of an increased difficulty associated with detecting and identifying device and interconnect failures as they occur in the system. Many avionics systems perform highly critical functions that require fault-tolerant system designs, with the ability to detect and identify loss of function while in flight, and to reconfigure into backup, and possibly degraded, modes of operation. Such systems therefore require an "embedded" test capability, which has not been provided by traditional test techniques.

It will be appreciated from the foregoing that modern integrated avionics systems need the support of a diagnostic and test capability that improves the maintainability and producibility of the systems, and also provides embedded testing during flight conditions. The present invention addresses these problems from several distinct perspectives.

SUMMARY OF THE INVENTION

The present invention resides in a unified testing architecture that can be adapted for testing a variety of different complex systems, such as integrated avionics systems. Briefly, and in general terms the apparatus of the invention comprises built-in component test means incorporated into multiple components of a complex electronic system, for performing physical tests on the components; built-in module test means incorporated into multiple modules of complex electronic system, wherein each module includes multiple components, and wherein the built-in module test means on a module coordinates operations of built-in component test means for components on the same module; maintenance processor means, for coordinating testing operations of multiple built-in in module test means; and maintenance executive test means, for coordinating operations of the maintenance processor means.

In accordance with one aspect of the invention, the built-in module test means also includes means for injecting predefined test signals at selected points in the module; means for controlling operation of the module at a controllable rate once the test signals have been injected; and means for observing signal states at selected points in the module during its operation on the test signals. More specifically, the built-in component test means includes a plurality of multiplexers coupled to inputs of flip-flops in a component; and control means, for selecting between two sets of inputs to the multiplexers. Selection of a first set of inputs to the multiplexers configures the component to perform its normal and intended operations, and selection of a second set of inputs to the multiplexers configures the component such that the flip-flops are connected in a serial chain for the introduction or retrieval of test data. The built-in module test means further includes means for storing a sequence of instructions for controlling the built-in component test means to perform a desired physical test sequence on at least one component.

The maintenance processor means and the maintenance executive test means include means for initiating at least one functional test, in which a signal is injected into a selected point in a module or component and its effect is monitored at other selected points.

In terms of a novel method, the invention includes the steps of performing physical tests on multiple components with built-in component testing logic incorporated into components of a complex electronic system; coordinating, in built-in module testing logic incorporated into a module, the operations of built-in component testing logic incorporated into components of the complex system; coordinating, in a maintenance processor, the testing operations of built-in module testing logic; and coordinating, in a maintenance executive test processor, overall operations of at least one maintenance processor. More specifically, the step of coordinating module testing includes injecting predefined test signals at selected points in the module; controlling operation of the module at a controllable rate once the test signals have been injected; and observing signal states at selected points in the module during its operation on the test signals.

The step of coordinating operation of built-in component testing logic includes multiplexing operational signals and test signals in a plurality of multiplexers coupled to inputs of flip-flops in a component; and selecting between two sets of inputs to the multiplexers. Selection of a first set of inputs to the multiplexers configures the component to perform its normal and intended operations, and selection of a second set of inputs to the multiplexers configures the component such that the flip-flops are connected in a serial chain for the introduction or retrieval of test data. The step of coordinating operations of a module includes storing a sequence of instructions for controlling performance of a desired physical test sequence on at least one component.

Further, the method comprises the additional step of initiating at least one functional test, in which a signal is injected into a selected point in a module or component and its effect is monitored at other selected points.

It will be appreciated from the foregoing that the present invention represents a significant advance in the field of test equipment for complex integrated systems, such as avionics systems. In particular, the invention provides a unified approach to integrated system testing, wherein test may be initiated at selected hierarchical levels, down to a component chip level, and a variety of different types of tests performed, to meet the needs of specific applications. Other aspects and advantages of the invention will become apparent from the following more detailed description, taken in conjunction with the drawings.

DESCRIPTION OF THE PREFERRED EMBODIMENT

Figure 1:
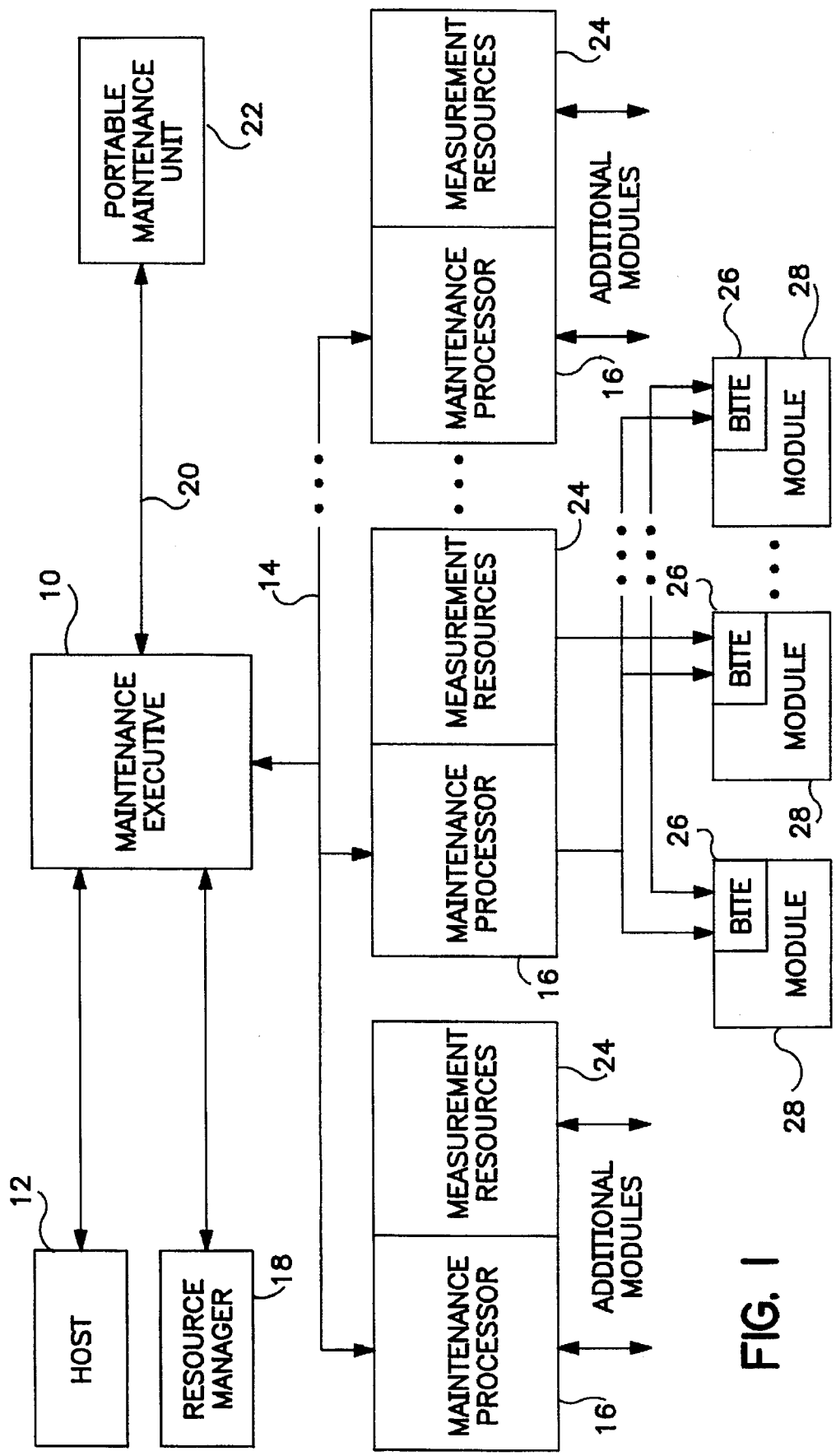
FIG. 1 is block diagram depicting the testing architecture of the invention, showing testing and diagnostic functions at an executive level, a subsystem level and a module level.

As shown in the drawings for purposes of illustration, the present invention concerns testing and diagnostic functions for advanced integrated avionics systems. Such systems pose difficulties for testing during manufacture, maintenance and operation, since the systems comprise many interconnected components and subsystems. In accordance with the present invention, a generic built-in testing architecture provides improved on-equipment fault detection and isolation capability, and versatility to adapt easily to a wide variety of system designs.

The testing architecture of the invention provides for control of testing operations at multiple levels: at an executive level that coordinates all testing within the system, at a subsystem or subassembly level, at a module (or board) level, and at a component (or chip) level. FIG. 1 shows the testing architecture for the first three of these levels. The architecture includes a maintenance executive, indicated by reference numeral 10, which coordinates all processing within the system. This software task may be contained in a dedicated maintenance processor or may be time-shared with operational tasks in an available system processor, indicated as the host processor 12. A standard maintenance bus 14 communicates commands to a number of maintenance processors 16, which actually conduct the bulk of the testing operations. Results are returned to the executive for final arbitration and isolation of failures. The executive 10 communicates test status data to the host 12, for forwarding to other systems, or to the pilot of an aircraft housing the avionics system being tested. In a reconfigurable avionics system, the executive 10 also transmits status information to a resource manager 18, to allow critical failures to be identified and eliminated by reconfiguration. The architecture also includes a standard military bus 20 for interface with portable ground support equipment 22.

Each maintenance processor 16 conducts all of the tests needed to meet fault detection and isolation requirements at a subsystem or subassembly level. Each maintenance processor contains sufficient memory and processing power to execute tests and analyze results to determine the "health" of the hardware it tests. As in the case of the maintenance executive 10, each maintenance processor 16 may be a dedicated processor or one of a number of time-shared tasks in an available system processor.

The maintenance executive 10 transmits commands to the maintenance processors 16 to establish a test mode. Each maintenance processor 16 in which a test mode has been established then controls associated measurement resources 24 and built in test equipment (BITE) 26 in each module 28 under the control of the maintenance processor, to conduct the requested tests. The maintenance processor 16 returns the test results to the maintenance executive 10.

The measurement resources 24 are drawn from a central pool of resources and associated with the maintenance processors 16 as required. The measurement resources include digital and analog stimulus circuits and monitoring circuits, to aid in performing functional tests. The maintenance processor 16 configures the various tests and then evaluates the response to determine whether the tested equipment has passed or failed.

Each module 28, which is typically a printed wiring assembly board or a number of boards, contains distributed built-in test equipment (BITE) 26 to aid in testing. The module may contain a wide variety of components, including off-the-shelf digital and analog devices, custom devices, radio-frequency (rf) circuits, and so forth. Testing of rf circuits poses an exception because the high-speed nature of the circuits makes it impractical to route signals to and from centralized resources for testing. Instead, local stimulus and detections circuits must be used to convert test signals to and from baseband analog or digital waveforms. In general, testing a module requires the testing of all of its components, as well as the interfaces between them.

Figure 2:
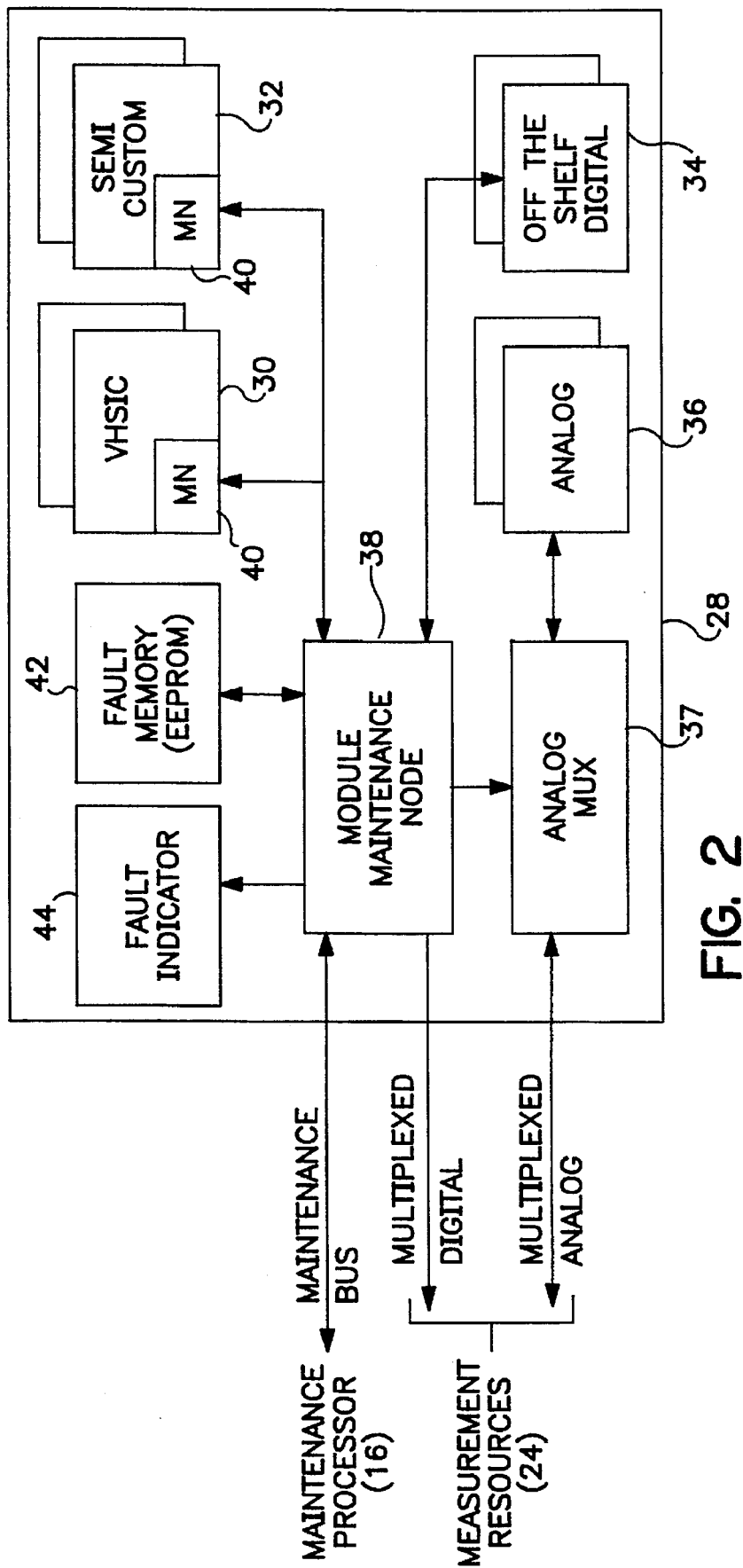
FIG. 2 is a block diagram of typical component module with built-in test capabilities in accordance with the present invention.

FIG. 2 shows the arrangement of functional components of a module, which is depicted as including a very-high-speed speed integrated circuit (VHSIC) chip 30, a semicustom chip 32, an off-the-shelf digital chip 34, and an analog component 36 and associated analog multiplexer 37. The module also includes a module maintenance node (MMN) 38, implemented as a single semicustom chip that serves as a distributed control point to coordinate all testing locally at the module level. The MMN 38 receives commands from the maintenance processor 16 and configures the module 28 for a test. Digital and analog test signals are routed to and from circuits under test using on-chip digital and external analog multiplexers. Stored test patterns can be applied from memory on the maintenance processor 16 to the devices being tested, and responses compared with expected results. The MMN 38 also contains a pseudo-random pattern generator and a signature analyzer, along with a control sequencer, to conduct pseudo-random tests autonomously from the maintenance processor 16. The MMN 38 provides the necessary control signals to interface with on-chip maintenance nodes (MN) 40 contained in the VHSIC and semicustom chips 30 and 32. Modules and/or chips may be tested simultaneously or serially (to provide single-chip fault isolation).

Upon detection of a fault, the MMN 38 stores the test results and associated environmental data in nonvolatile fault memory 42, for later retrieval by a technician in a maintenance depot. The MMN 38 also actuates a fault indicator 44, to facilitate identification of a failed module.

Figure 3:
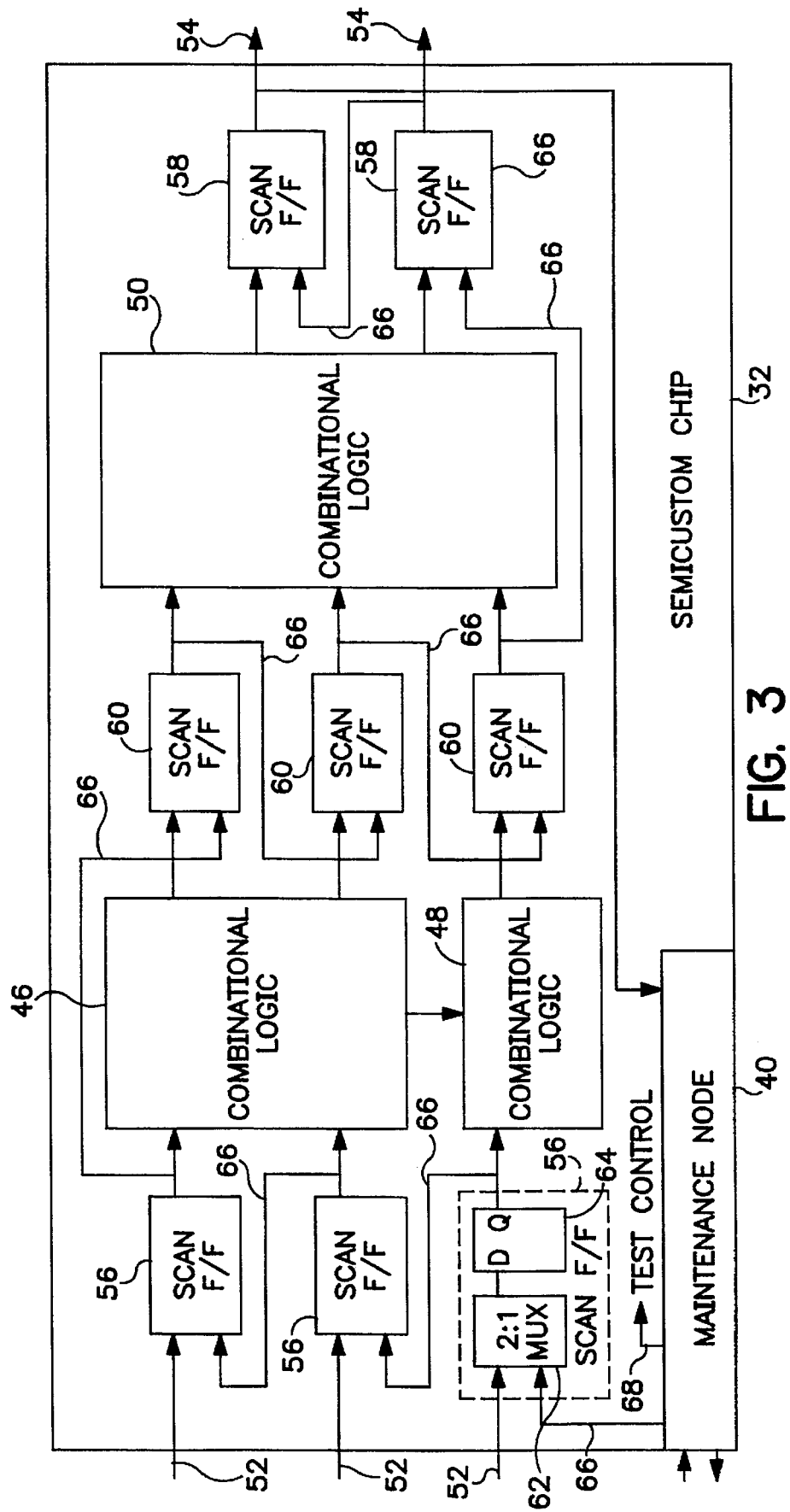
FIG. 3 is a schematic diagram of a typical component chip including built-in test logic for performing serial scan tests.

The on-chip maintanance nodes (MN) 40 are needed to coordinate operation of some types of digital chips, those that are equipped with serial scan loops. Serial scanning is a technique used to test digital logic using specially designed flip-flops built into the chip circuitry. FIG. 3 illustrates the technique in the case of a semicustom chip containing three sections of combinatorial logic, indicated at 46, 48 and 50. The chip has three inputs, on lines 52, and two outputs, on lines 54. The three input lines 52 pass through three flip-flops 56, designated scan flip-flops, and the three output lines 54 also pass through flip-flops 58. In addition, the chip includes three additional scan flip-flops 60 connected in lines conveying intermediate signals to combinatorial logic 50. As shown in one instance only, each scan flip-flop includes a two-to-one multiplexer 62 and a D-type flip-flop 64. One input to the multiplexer 62 is the normal signal path for the semicustom chip in its normal operational mode. The other input to the multiplexer 62 is a test signal path derived from the maintenance node 40. The output of the flip-flop 64 is connected both to its normal operational path and to a multiplexer input in a next scan flip-flop, as indicated by the connecting lines 66. It will be noted that the connecting lines 66 form a continuous loop of sequentially connected scan flip-flops, and that the loop begins and ends at the maintenance node 40. A test control signal, indicated at 68, controls which multiplexer inputs are selected and determines whether the chip operates in a normal mode or a test mode.

There are several different operating modes of the chip, as determined by the maintenance node 40. In a functional mode, the chip performs its normal operational functions. In an off-line test mode, the chip assumes a serial scan loop configuration, in which data signals are shifted to and from the module maintenance node (MMN). In an on-line test mode, the scan flip-flops provide the MMN data concerning their status during operation. An interface test provides a variation of the on-line test. The maintenance node 40 selects only those scan flip flops at chip input/output lines and configures those into a scan loop for testing purposes.

The testing architecture of the present invention provides a hierarchy of tests, from which a selection may be made to meet the requirements of a particular system. The hierarchy is as follows:

```
Functional testing
    On-line
        Critical signal monitoring
        Redundancy
    Off-line
        System end-to-end
        Subsystem end-to-end
Processor diagnostic testing
    On-line
        Error detect and correct
        Watch dog timer
    Off-line
        Memory
        Interface loop-back
Physical testing
    Off-line
        Pseudo-random
        Interface
```

Achieving near full test coverage with only functional tests would require a prohibitively long time and would consume too much memory for pattern storage. Physical tests, on the other hand, cannot be used on-line or to provide a quick overview status of the system. Therefore, all three types should be used in most systems since they provide complementary test coverage and allow tests to be tailored to various maintenance requirements. The following provides a more detailed discussion of the types of tests.

Functional testing: Functional testing includes traditional off-line and end-to-end type tests, where a signal is injected into the "front end" of a system or subsystem and the response is monitored at a point, or points, downstream. On-line testing may also be performed by determining the proper waveform for a critical signal from the state of the system and verifying the signal through measurement; or by comparing the outputs of redundant circuits. Functional tests provide an overall rough indication of the "health" of the system, but are usually not detailed enough to allow extensive fault detection or isolation.

Processor Diagnostic Testing: This includes self-test features built into most processors and computers to test themselves, their buses and their peripheral devices. In this case, the maintenance subsystem does not actively perform the tests, but simply monitors the results of tests performed by intelligent functional circuits. The types of tests used include instruction set verification, memory checksums, RAM read/write tests, interface loop-backs, parity tests, error detection and correction codes, and watch-dog timers. Depending upon the particular test, these techniques may be applied on-line or off-line and provide full or partial testing of processors, peripherals, and their interfaces.

Physical testing: Physical testing provides the lowest level test information. The purpose of physical testing is not to ensure that each circuit performs its function properly, but that individual circuit elements, such as gates and flip-flops, and their interconnections are still intact. The assumption made in physical testing is that the collection of elements has been correctly designed and verified to perform some intended function, and that as long as no element has failed, the function is still being performed properly. Physical testing includes serial scan techniques and pseudo-random testing, and provides the greatest fault detection and isolation capability. Because of the interruptive nature of these tests, they are performed off-line only.

Figure 4:
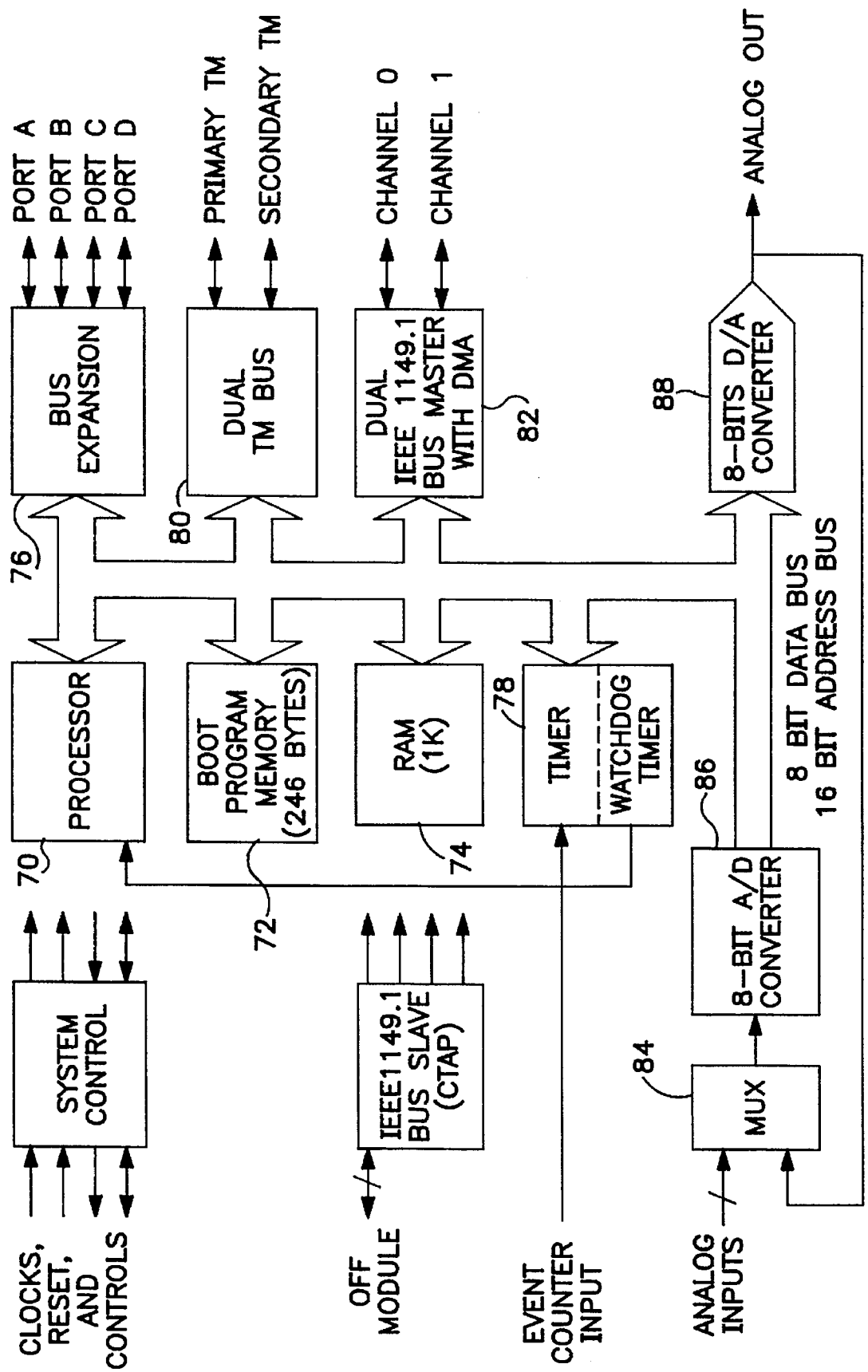
FIG. 4 is a block diagram of a module maintenance node (MMN) providing built-in testing capability for a module.

Testable Module Design: As outlined above, a module maintenance node (MMN) 38 should be included in certain types of module components. As shown in detail in FIG. 4, the MMN includes a processor 70, a programmable read-only memory (PROM) 72 for storage of a core operating system (boot program) for the processor, a random access memory (RAM) 74 for storage of additional operating system software not in the PROM or external to the MMN, a bus expansion module 76 providing four input and output ports, and a timer and watchdog timer 78. The watchdog timer provides an interrupt signal in the event that the timer is not reset before a designated number of clock cycles have passed. The MMN also includes a dual TM bus module 80 providing primary and secondary test module buses, and a bus master module 82 in accordance with IEEE Std. 1149.1 The 1149.1 bus master interprets commands from the processor and controls scan operations on the module in conformance with IEEE Std. 1149.1-1990, IEEE Standard Test Access Port and Boundary-Scan Architecture, 21 May, 1990. The bus master has internal registers that can be loaded prior to beginning a scan operation, to define an instruction sequence selection and other parameters relating to the scan operation.

The MMN 38 further includes a 16-to-1 multiplexer 84, an 8-bit analog-to-digital converter 86 and an 8-bit digital-to-analog converter 88. One of the multiplexer inputs is dedicated for use by the digital-to-analog converter 88, for self-test of the MMN 38, and the other fifteen are available as external inputs.

Module Clock Control: Prior to testing, the maintenance system must replace all of a module's functional clock signals with ones identical to its own. This can be accomplished at a clock signal distribution source, at clock receivers on the module, or inside a semicustom device. Off-the-shelf logic clocks present a special case and all off-the-shelf logic clocks must be maintained separate from VHSIC and semicustom devices. Each MMN 38 provides this ability through use of a Shadow Register External Clock Override output signal, which may be gated with functional clocks to provide enable/disable, single-step, and duty cycling of "glue logic" during testing. Since VHSIC and semicustom devices possess internal clock control circuitry, their clock lines need not be externally controlled and, therefore, must be kept physically separate from those of off-the-shelf logic.

Initialization of Module Devices: All synchronous devices on a module should be capable of being directly set or reset to a known state. This feature is critical to ensuring reliable and efficient power-up initialization of large, synchronous systems. In addition, module testing with either stored or pseudo-random patterns tends to leave hardware in a fairly random state. Often the fastest way to return the hardware to normal operation is by asserting a reset signal. Therefore, the maintenance system is also provided with the capability of issuing module reset signals. It is important to keep glue logic resets separate from those of VHSIC or semicustom devices. This makes it possible to reset glue logic prior to a testing without resetting VHSIC or semicustom devices, which may have been specifically configured for a test.

Effect of Device Type on Module Test Design: Designing modules with custom and semicustom devices incorporating maintenance nodes does not present any special considerations with respect to test capability. The maintenance nodes on the devices are simply connected to their dedicated interfaces in the MMN. This process involves point-to-point connections for data paths and common distribution of control signals among all devices.

By way of contrast, designing testable modules that include off-the-shelf logic poses some significant difficulties. The lack of a well structured maintenance interface makes the job of testing and isolating failures in this type of logic extremely difficult. As a result, various techniques have been developed to address the testability problems associated with off-the-shelf devices. Although these techniques do not in themselves constitute a structured design approach, they do identify ways to avoid some of the more common pitfalls that can lead to untestable designs. Some of these techniques are outlined in the following paragraphs.

Logic should be designed such that redundant logic is separately controllable and observable during a test. The MMN 38 has to take independent control of such redundant logic during a test, and return them to their redundant configuration after the test. Asynchronous logic elements, such as one-shots and delay lines, should be avoided altogether if possible. The distribution of asynchronous elements throughout a module may result in a variety of complex test environments, which may not be supportable by the maintenance system.

Any long counter chains in the off-the-shelf logic should be provided with a parallel loading capability. This will minimize the number of test sequences required and assure reasonable test coverage of the counter.

If the logic includes long feedback loops, fault detection and isolation requires some means of breaking these long paths for testing purposes. This allows the maintenance system to monitor feedback signals as well as to inject test data into the feedback paths. Otherwise, detection and isolation of faults to individual devices within such loops is almost impossible.

The use of wired-OR logic degrades the ability to isolate a faulty bus. Therefore, the use of this type of logic is best avoided in the test environment.

Finally, any unused input/output (I/O) pins of a device should be used to increase the controllability and observability of a module's internal logic. Access to internal nodes in the module can greatly reduce the complexity and time required for performing module tests.

Memory devices are a specific class of off-the-shelf components, but their highly structured nature makes interfacing with a maintenance system relatively straightforward. Basically, the maintenance system must have access to all address, data, and read/write control signals. Address access means write access, regardless of whether the memory under test is a read-only memory (ROM) or a read-write memory (RAM). Address access can be effected through the use of three-state address drivers over which the maintenance system has complete control. In the case of a ROM, control over the read strobe signal is also required, as well as access to the data lines. This allows each memory location to be read and compared to known results. In the case of a RAM, control over the read and write strobe signals and read and write access to the data lines are required. Testing of a RAM can then be accomplished by writing to and reading from each memory location.

All module inputs and outputs should ideally be registered, i.e. should pass through registers accessible to the maintenance system. This would facilitate the application and retrieval of test patterns as close to a module's physical boundaries as possible. If this is not possible, an alternative it to use three-state drivers on module outputs; and inputs. This allows the maintenance system to disable functional outputs while injecting test signals of its own.

Testable Chip Design:

Components using an on-chip test controller must conform to design constraints and guidelines to ensure compatibility between the on-chip test controller and the component being tested. The on-chip test controller verifies the functionality of the component and provides inter-component test access to the board-level test controller. Test features of a chip must be transparent to the normal functions of the chip. In most cases, simply substituting a conventional cell design with one containing testability enhancements, and providing the proper grouping of test control lines, will be sufficient to introduce testability to the chip. In some special cases, unique test features will need to be added in order to improve either controllability, observability, or both.

Retrospective Summary:

The essence of the present invention is a testing architecture that provides for testing of complex systems, such as integrated avionics systems, on multiple hierarchical levels. At the lowest level, components or chips are provided with on-chip test controllers, which provide for testing of functionality of the components at a detailed internal level, by means of scan techniques and pseudo-random number sequence generators. The results of component tests are collected at a module level, using a module test controller, and are forwarded to a maintenance processor responsible for the testing of multiple modules. Finally, multiple maintenance processors are controlled by a maintenance executive.

Using this hierarchical testing architecture, a complex system can be subjected to any desired combination of functional testing, processor diagnostic testing, and physical testing, in both on-line and off-line modes, to achieve a desirably high percentage of test coverage. The combination of test modes is selected based on maintenance requirements for the system under test.

It will be appreciated from the foregoing that the present invention represents a significant advance in the field of testing of complex integrated computer systems, such as in advanced avionics systems. In particular, the invention provides a unified and hierarchical approach to complex systems testing. The approach can be conveniently adapted to practically any complex system, and test results are provided at a functional level and a physical level, provided design guidelines are followed for device design. It will also be appreciated that, although an embodiment of the invention has been described in detail by way of illustration, various aspects of the disclosed embodiment may be modified without departing from the spirit and scope of the invention. Accordingly, the invention should not be limited except as by the appended claims.

We claim:

1. A built-in testing architecture providing on-equipment fault detection and isolation capability, for complex integrated electronic systems having multiple components assembled onto at least one module, the built-in testing architecture comprising:

built-in component test means incorporated into multiple components of a complex electronic system, for performing physical tests on the components;

built-in module test means incorporated into each module of a complex electronic system, wherein each module includes multiple components, and wherein the built-in module test means on a module coordinates operations of built-in component test means for components on the same module;

built-in maintenance processor means, for coordinating testing operations of multiple built-in module test means; and built-in maintenance executive test means, for coordinating operations of the maintenance processor means.

2. A built-in testing architecture as defined in claim 1, wherein the built-in module test means includes:

means for injecting predefined test signals at selected points in the module;

means for controlling operation of the module at a controllable rate once the test signals have been injected; and means for observing signal states at selected points in the module during its operation on the test signals.

3. A built-in testing architecture as defined in claim 1, wherein the built-in component test means includes:

a plurality of multiplexers coupled to inputs of flip-flops in a component; and control means, for selecting between two sets of inputs to the multiplexers, wherein selection of a first set of inputs to the multiplexers configures the component to perform its normal and intended operations, and selection of a second set of inputs to the multiplexers configures the component such that the flip-flops are connected in a serial chain for the introduction or retrieval of test data;

and wherein the built-in module test means further includes means for storing a sequence of instructions for controlling the built-in component test means to perform a desired physical test sequence on at least one component.

4. A built-in testing architecture as defined in claim 3, wherein the maintenance processor means and the maintenance executive test means include means for initiating at least one functional test, in which a signal is injected into a selected point in a module or component and its effect is monitored at other selected points.

5. A built-in testing architecture as defined in claim 1, wherein the maintenance processor means and the maintenance executive test means include means for initiating at least one functional test, in which a signal is injected into a selected point in a module or component and its effect is monitored at other selected points.

6. A method of operation of a built-in testing architecture, for testing complex integrated electronic systems having multiple components assembled onto at least one module, the method comprising the steps of:

performing physical tests on multiple components with built-in component testing logic incorporated into components of a complex electronic system;

coordinating, in built-in module testing logic incorporated into a module, the operations of built-in component testing logic incorporated into components of the complex system;

coordinating, in a built-in maintenance processor, the testing operations of built-in module testing logic; and coordinating, in a built-in maintenance executive test processor, overall operations of at least one maintenance processor.

7. A method as defined in claim 6, wherein the step of coordinating module testing includes:

injecting predefined test signals at selected points in the module;

controlling operation of the module at a controllable rate once the test signals have been injected; and observing signal states at selected points in the module during its operation on the test signals.

8. A method as defined in claim 6, wherein the step of coordinating the operations of built-in component testing logic includes:

multiplexing operational signals and test signals in a plurality of multiplexers coupled to inputs of flip-flops in a component; and selecting between two sets of inputs to the multiplexers, wherein selection of a first set of inputs to the multiplexers configures the component to perform its normal and intended operations, and selection of a second set of inputs to the multiplexers configures the component such that the flip-flops are connected in a serial chain for the introduction or retrieval of test data;

and wherein the step of coordinating operations of a module includes storing a sequence of instructions for controlling performance of a desired physical test sequence on at least one component.

9. A method as defined in claim 8, and further comprising the step of:

initiating at least one functional test, in which a signal is injected into a selected point in a module or component and its effect is monitored at other selected points.

10. A method as defined in claim 6, and further comprising the step of:

initiating at least one functional test, in which a signal is injected into a selected point in a module or component and its effect is monitored at other selected points.

11. For use in a built-in testing architecture for testing complex integrated electronic systems having multiple components assembled onto at least one module, a module maintenance node for coordinating testing at a module level, the module maintenance node comprising:

means integrated with the module, for switching operation of the module to a functional mode in which the module performs its normal functions;

means integrated with the module, for switching operation of the module to a test mode in which data signals are transmitted to and received from the module maintenance node;

built-in means for generating test signals for transmission to the module operating in the test mode;

means for receiving and analyzing test signals received from the module operating in the test mode; and built-in processor means for controlling all the aforementioned means in the module maintenance node.

* * * * *